United States Patent Office
3,623,846
Patented Nov. 30, 1971

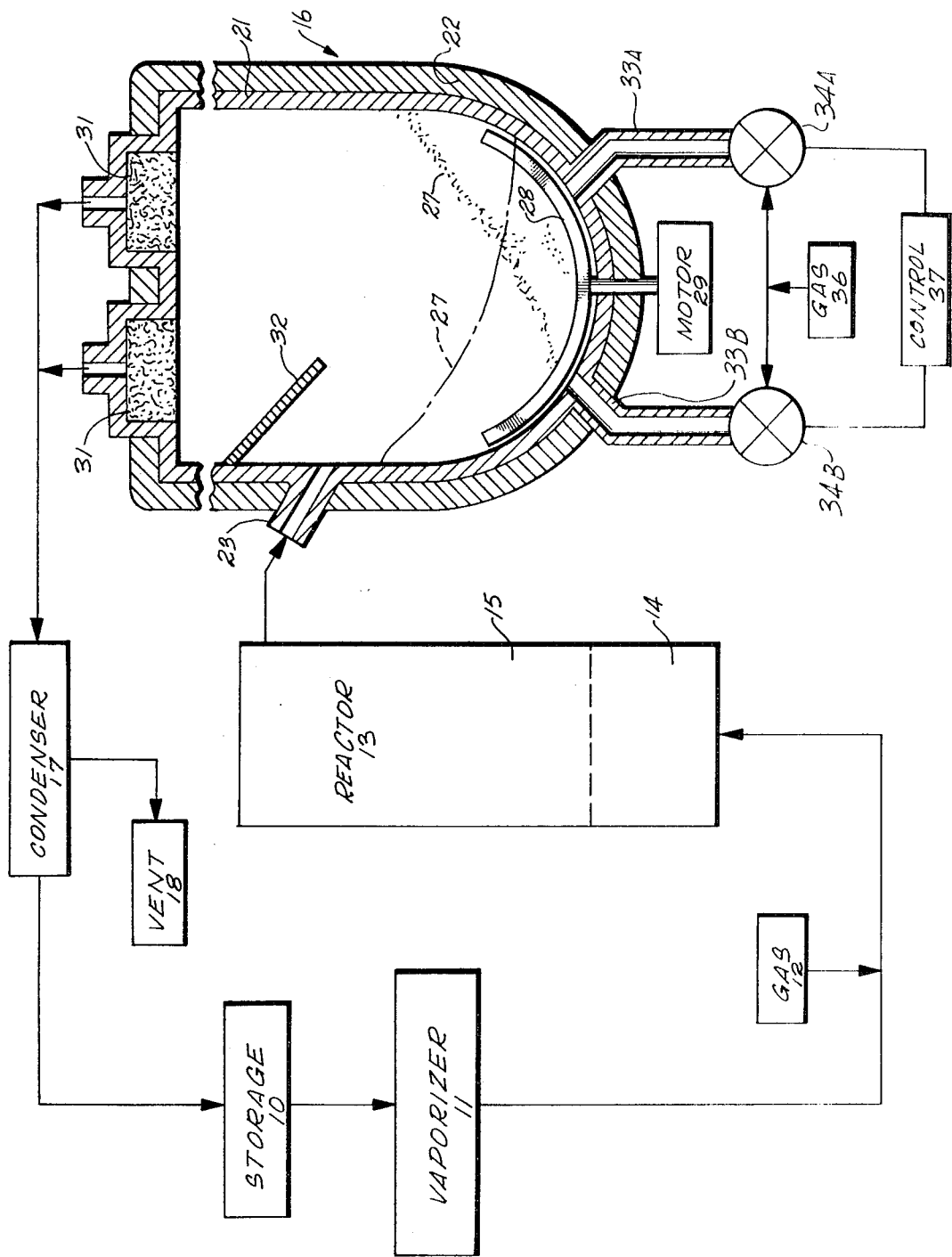

3,623,846
PARTICLE SIZE CONTROL
Arthur P. Haag, Moraga, and Meyer Weiner, Orinda, Calif., assignors to Dart Industries, Inc., Los Angeles, Calif.
Filed Dec. 12, 1969, Ser. No. 884,655
Int. Cl. B01j 17/26, 17/30; C01g 23/02
U.S. Cl. 23—294
12 Claims

ABSTRACT OF THE DISCLOSURE

Method and apparatus for controlling particle size during condensation or desublimation of a material such as titanium trichloride is described. The technique involves injecting a vapor stream into an enlarged chamber maintained at a temperature below the condensation temperature of a material in the vapor stream. An inert gas is intermittently puffed through apertures in the enlarged chamber for buoying particles of material condensed from the vapor into the entering vapor stream so that additional material condenses thereon, thereby enlarging the particle size.

BACKGROUND

Titanium trichloride has been found to be a valuable catalyst material; particularly for the polymerization of polypropylene. The titanium trichloride apparently occurs in more than one allotropic form and it is found that the effectiveness of the catalyst depends on the form in which it occurs. This form is at least in part determined by the technique employed for forming the titanium trichloride.

A technique that has been employed in the past involves the reaction of titanium tetrachloride vapor with sponge titanium at elevated temperature to produce titanium-trichloride by the reaction

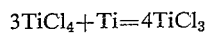

$$3TiCl_4 + Ti = 4TiCl_3$$

The product of the reaction is a hot gas or vapor stream, including excess titanium tetrachloride, titanium trichloride vapor, and usually an inert carrier gas. The titanium trichloride is condensed into a powder by quenching the hot gas and the powder is recovered.

One of the parameters of interest in the production of polypropylene is the particle size of the polymer produced, and it appears that, in at least some of the polymerization techniques employed, the particle size of the catalyst employed in the polymerization reaction can affect the crystal size of the polypropylene. It is therefore desirable to have a technique for controlling the particle size of titanium trichloride in the original manufacturing process.

SUMMARY OF THE INVENTION

Thus, in the practice of this invention according to a preferred embodiment, there are provided method and means for injecting a gas stream including a material such as titanium trichloride in the form of a condensable vapor into an enlarged chamber maintained at a temperature below the condensation temperature of the vaporous material. Solid particles of the condensed material are accumulated in the chamber and intermittently mixed with the injected stream of vapor so that additional material condenses thereon and enlarges the particle size.

DRAWING

Objects and many of the attendant advantages of this invention will be appreciated as the same becomes better understood by reference to the following detailed description when considered in connection with the accompanying drawing, which illustrates in cross section apparatus useful for particle size control and also shows associated equipment schematically.

DESCRIPTION

The drawing illustrates, partly in cross section and partly schematically, apparatus for particle size control constructed according to principles of this invention. As illustrated in this preferred embodiment, there is provided a storage tank 10 for containing liquid titanium tetrachloride. Liquid is passed from the storage tank 10 to a vaporizer 11 which heats and evaporates the titanium tetrachloride to produce a vapor thereof. It will be readily appreciated that in the schematic diagram herein provided that numerous conventional elements employed in a production operation have been deleted for purposes of clarity. Thus, for example, a variety of pumps, valves, mixers, heaters, and metering and control devices have been deleted since they form no part of this invention, and are entirely conventional elements employed in their conventional manner. An inert gas supply 12 is provided for mixing inert gas such as nitrogen, helium, hydrogen, or argon with titanium tetrachloride vapor coming from the vaporizer 11. The inert gas provides additional gas volume for sweeping the titanium tetrachloride vapor through the balance of the described system. If desired, the gas may be added in the vaporizer to assist in its operation, and it may be preheated if the possibility exists of cooling to the dewpoint of the titanium tetrachloride.

The mixture of titanium tetrachloride vapor and sweep gas is injected into the bottom of a conventional reactor 13 which in one embodiment comprises a steel cylinder about one foot in diameter and about ten feet long heated to about 900° C. A lower zone 14 in the reactor is filled with pieces of graphite so that the gas or vapor stream passing thereover is preheated. The upper portion 15 of the reactor is filled with sponge titanium with which the titanium tetrachloride reacts to produce titanium trichloride according to the reaction set forth hereinabove.

Effluent from the top of the reactor is a vapor stream containing unreacted titanium tetrachloride vapor, the sweep gas from the gas supply 12, and titanium trichloride vapor since the reactor is maintained at a temperature substantially above the sublimation temperature of titanium trichloride. The vapor stream is then injected into a desublimer or settler 16 described in greater detail hereinafter. The desublimer is maintained at a temperature below the sublimation temperature of titanium trichloride and above the boiling point of titanium tetrachloride so that solid titanium trichloride is condensed in the desublimer and vaporous titanium tetrachloride and the sweep gas pass through.

The vapor stream from the desublimer 16 then passes to a conventional condenser 17 where the titanium tetrachloride is condensed to a liquid and recycled to the storage tank 10. The sweep gas and other injected gases, hereinafter described, are passed from the condenser to a vent 18.

The desublimer or settler 16 comprises a metal shell 21 forming an enlarged chamber having a sufficiently large cross section that the flow of gases upwardly therethrough is insufficient to buoy a substantial portion of the particles accumulating in the chamber and carry them out with exiting gases. The shell 21 is surrounded by a temperature control jacket 22 for maintaining the temperature of the shell below the condensation temperature of titanium trichloride and above the dew point of titanium tetrachloride. The temperature control jacket 22 is a conventional element such as electric heaters or a surrounding jacket of heat transfer fluid so that either heating or cooling of the shell can be provided. Any other conventional means for maintaining the temperature of the shell 21 in the aforementioned range may be employed.

A pipe 23 is provided on a side of the shell 21 for conducting vapor from the reactor 13 to the interior of the shell. The pipe 23 is fabricated of a heat resistant metal since it is maintained at a temperature of from 750 to 900 degrees C. to prevent titanium trichloride condensation on the walls.

Since the desublimer is below the sublimation temperature, solid titanium trichloride condenses inside the desublimer and settles to the bottom thereof as a loose, finely-divided powder 27. A rotating paddle 28 driven by a motor 29 moves about the bottom of the desublimer to stir the powder 27 and prevent accumulations of powder on the wall of the chamber. If desired, the paddle 28 may be extended any distance up the sides of the shell 21 to remove accretions of solid titanium trichloride.

The vapor stream entering the chamber through the pipe 23 includes unreacted titanium tetrachloride and sweep gas as hereinabove mentioned. These gases exit from the setling chamber or desublimer through filters 31 which serve to prevent any particles of titanium trichloride buoyed by the gases from leaving the settling chamber. After passing through the filters, the gases pass to the condenser 17 as hereinabove described. If desired, means may be provided for back flushing gas through the filters 31 for removing accumulations of particles therefrom.

A baffle plate 32 is provided between the gas inlet pipe 23 and the filters 31 to inhibit direct flow of gases therebetween and minimize pass of uncondensed titanium trichloride vapor from the settler Near the bottom of the settler, a pair of gas inlet pipes 33 are provided through the shell 21. Each of the gas inlet pipes 33 is connected to a separate conventional solenoid controlled valve 34. A gas source 36 supplies pressurized inert gas to both of the solenoid valves 34. A controller 37 is also connected to both of the solenoid valves 34. The controller 37 comprises a conventional multiple contact timer or the like for selectively opening and closing the valves 34 according to a selected time schedule.

During operation of the system herein described, titanium trichloride particles are formed by condensation in the cooler desublimer and settle to the bottom of the settler as a loose powder 27 which accumulates over the gas inlet pipes 33. The particles initially formed upon desublimation of the titanium trichloride are in the order of about one micron diameter, which for some catalyst uses is considered too fine. Therefore, in order to cause particle growth, an inert gas is injected in the bottom of the settler through one of the gas inlet pipes 33a by opening the solenoid valve 34a connected to the inert gas supply 36. The flow of gas into the chamber through the accumulated powder 27 buoys up the powder and temporarily suspends it in the vapor within the desublimer. Some of the cool vapor having particles of titanium trichloride suspended therein is drawn into and mixed with the stream of hot vajors being injected into the chamber through the pipe 23. The consequent cooling of the injected gas stream causes condensation or desublimation of the titanium trichloride vapor which preferentially occurs on the existing particles which serve as condensation nuclei. The condensation of additional titanium trichloride on the particels causes an increase in their size. It is found with such a technique that instead of one micron particles accumulating in the settler, that particles in the range of from two to eight microns are readily prepared, which represents a volume increase in the order of from eight to sixty-four times the original volume of the particles.

If the flow of inert gas into the bottom of the settler is steady, two undesirable effects may occur. Continuous flow of gas through accumulated powder in the bottom of the settler may channel so that the gas flows through substantially the same path at all times and only a portion of the particles are buoyed up to a region where they may be drawn into the hot vapor stream. Likewise, in a settler having continuous flow, a degree of elutriation may occur whereby the finest particles are carried in the upwardly moving gas stream so as to accumulate on the filters 31 and block flow therethrough.

In order to substantially preclude these effects, inert gas is injected through accumulated powder in the bottom of the settler at spaced intervals so that intermittent buoying of the particles occurs. An intermittent flow of gas through the accumulated powder raises particles of powder off the bottom and mixes them with vapor in the desublimer, but does not carry any substantial portion to the filters 31 to cause clogging or blinding thereof. The flow of inert gas through the powder buoys up particles in the path of the gas stream, and also draws adjacent particles into the gas stream so that they are also buoyed up The flow of gas is then terminated so that an insubstantial quantity of powder is lifted to the level of the filters.

In order to minimize the effect of channeling through the powder, and to provide a thorough mixing of powders in the desublimer, a plurality of gas inlets are provided at the bottom. In the illustrated embodiment, two gas inlet pipes 33a and 33b are employed, each with its separate solenoid controlled valve 34a and 34b, respectively. In operation, one of the valves, 34a for example, is opened for an interval so as to inject gas into the desublimer through accumulated powders 27 and buoy the powders up in the chamber. The valve 34a is then closed to minimize elutriation of particles and the powder slowly resettles to the bottom of the desublimer, possibly in an arrangement different from the original accumulation as illustrated in phantom in the drawing.

After a selected time interval to permit the settling of at least the coarser particles, another solenoid valve 34b is opened for an interval to buoy up powder accumulated over the gas inlet 33b. The solenoid valve 34b is left open for an interval and then shut and a time permitted to elapse before the first solenoid valve 34a is reopened. Thus, the intermittent gas puffing cycle in the desublimer proceeds: first valve 34a open, both valves closed, second valve 34b open, both valves closed, first valve 34a open, both valves closed, etc.

Since the growth of particles depends on their coming in contact with the hot vapor stream containing vaporous titanium trichloride, the degree of growth obtained will depend on the number of times the particle is mixed into the vapor stream. It will also be apparent that after a large number of particles has been buoyed up by a period of flow of inert gas into the desublimer, many particles will remain buoyed up for an interval and slowly settle out at a rate determined by the usual rate of flow of gas through the desublimer from the reactor, the buoying gas viscosity and density, the particle size, and also the density and turbulence of the vapor in the desublimer. In any event, the larger and heavier particles will settle out more rapidly and the finer particles will remain buoyed up in temporary suspension in the vapor for a longer period of time. In this manner, smaller particles have a higher degree of probability of being mixed with the hot vapor stream for particle growth. Since the finer particles encounter the hot gas stream more often there is a preferential growth on finer particles as compared with larger particles so that a good degree of particle size uniformity is obtained in the titanium trichloride powder in the desublimer.

In a specific example of apparatus and process according to principles of this invention, titanium trichloride was made by reduction of titanium tetrachloride with sponge titanium. In this process about 50 pounds per hour of titanium tretrachloride vapor was passed through a bed of sponge titanium at a temperature of about 900° C. In addition, about 10 cubic feet per hour of argon was mixed with the vaporized titanium tetrachloride in order to keep the vapor moving through the system as desired. Under the selected reaction conditions, about 5 to 10 pounds per hour of titanium trichloride vapor was produced and was passed to a desublimer and settler through a ¾ inch ID graphite tube maintained at about 900° C. The pressure in the desublimer was maintained in the range of from about 5 to 15 p.s.i.g.

The desublimer comprised a steel cylinder about 4 feet inside diameter and 16 feet tall, with fine stainless steel filters at the top. A pair of standard ¼ inch pipes are connected to the bottom of the desublimer on opposite sides thereof, and conventional solenoid operated valves are provided on the two lines so that argon gas can be injected into the bottom of the desublimer. The walls of the desublimer were maintained in the range of from about 300 to 350° C. so that the gases and vapors reaching the filters at the top of the desublimer were at a temperature of less than about 400° C. In this way, titanium tetrachloride is maintained as a vapor and titanium trichloride condenses.

After about 12 to 18 hours of operation of the reactor and desublimer, titanium trichloride powder accumulated in the bottom of the settler to a depth of about two feet.

Throughout the period of operation, argon, nitrogen, or helium gas is admitted at intermittent intervals alternately through the two gas inlets by means of solenoid valves operated by an automatic timer. In one mode of operation, argon gas at about 20 p.s.i.g. was left on for about 5 seconds on one valve, turned off for 15 seconds, turned on for 5 seconds on the other valve, turned off for 15 seconds, and so on. In another mode of operation, nitrogen gas was injected alternately through the two gas inlets at a rate of about 7.2 cubic feet per minute in a cycle with 1 minute one valve on, 1 minute both valves off, 1 minute the other valve on, 1 minute both valves off, and so on. In each of these modes of operation, titanium trichloride particles principally in the size range of from about 2 to 8 microns accumulated in the desublimer. If desired, titanium tetrachloride vapor at elevated temperature can be employed in lieu of inert gas for reducing the volume of non-condensable material in the system.

Although only one example of a method and apparatus for practice of this invention have been set forth in detail, many variations and modifications will be apparent to one skilled in the art. Thus, for example, in order to operate apparatus for particle size control with different materials or different particle sizes, variations can be made in gas puffing intervals, flow rates, densities, and temperatures to effect the desired range of particle growth.

What is claimed is:

1. A process for controlling particle size comprising the steps of:
   injecting a vapor stream including a material in the form of a condensable vapor into a chamber maintained at a temperature below the condensation temperature of the material;
   condensing the condensable vapor to form solid particles of the material;
   collecting the solid particles of the material on the bottom of the chamber; and
   intermittently buoying the solid particles of material collected on the bottom of the chamber into the injected vapor stream whereby desublimation of the condensable material on the solid particles increases particle size.

2. A process as defined in claim 1 wherein the step of buoying comprises intermittently passing a gas upwardly through collected particles, the volume of gas being sufficient to buoy particles into the injected vapor stream and insufficient to carry buoyed particles out of the chamber.

3. A process for enlarging the particle size of titanium trichloride comprising:
   maintaining a chamber at a temperature greater than the boiling point of titanium tetrachloride and less than the sublimation temperature of titanium trichloride;
   injecting a vapor stream including titanium tetrachloride and titanium trichloride at a temperature above the sublimation temperature of titanium trichloride into the chamber;
   condensing the titanium trichloride vapor to form solid particles and collecting the solid particles on the bottom of the chamber; and
   intermittently buoying the solid particles of titanium trichloride collected on the bottom of the chamber into the injected stream of titanium tetrachloride and titanium trichloride vapor whereby desublimation of the condensable titanium trichloride on the solid particles increases particle size.

4. A process as defined in claim 3 wherein a step of intermittently buoying comprises:
   intermittently introducing inert gas beneath collected titanium trichloride particles for temporarily buoying the particles into vapor in the chamber.

5. A process as defined in claim 4 wherein the step of intermittently buoying further comprises:
   intermittently introducing inert gas beneath collected particles of titanium trichloride at a different location from, and alternately with, the first introducing step, for minimizing channeling in collected particles.

6. A process as defined in claim 4 wherein the step of intermittently admiting inert gas comprises introducing gas at a selected flow rate and time interval to introduce a volume of gas sufficient to temporarily buoy particles into the stream of injected titanium trichloride and titanium tetrachloride vapor and insufficient to carry particles out of the chamber.

7. An apparatus for producing a desublimed material having controlled particle size comprising, in combination
   a reactor for reacting materials to produce a desublimable vapor;
   means for transmitting the desublimable vapor from the reactor to the inlet means of a desublimer, and a desublimer comprising
   a chamber having a top section and a bottom section;
   control means for maintaining the temperature of the chamber below the sublimation temperature of the desublimable material;
   inlet means for introducing the desublimable material in vapor form into said chamber;
   injection means for intermittently injecting an inert gas into the chamber through the bottom section for temporarily buoying up desublimed material accumulated in the bottom section of the chamber; and
   outlet means in the top section of the chamber for exhausting gases from the interior of the chamber.

8. An apparatus according to claim 7 wherein there is also filter means in the top section of the chamber associated with the outlet means for preventing exhausting of desublimed material from the interior of the chamber.

9. An apparatus according to claim 7 wherein the injection means comprises:
   a plurality of inlets; and
   means for admitting the inert gas alternately and intermittently to each of the inlets.

10. An apparatus according to claim 7 wherein a baffle means is positioned within the chamber for inhibiting direct vapor flow from the inlet means to the outlet means.

11. An apparatus for producing titanium trichloride of controlled particle size comprising, in combination
    a reactor for reacting titanium tetrachloride with aluminum at elevated temperatures to produce a desublimable vapor containing titanium trichloride,
    means for transmitting the desublimable vapor from the reactor to the inlet means of a desublimer, and a desublimer comprising a chamber having a top section and a bottom section, control means for maintaining the temperature of the chamber below the sublimation temperature of the titanium trichloride in the desublimable vapor, inlet means for receiving the desublimable vapor and introducing it to the chamber, injection means for intermittently injecting an inert gas into the chamber through the bottom section for temporarily buoying up desublimed titanium trichloride particles accumulated in the bottom section of the chamber, outlet means in the top section of the chamber for exhausting gases from the interior of the chamber, and filter means associated withh the outlet means in the top section of the chamber for preventing exhausting of desublimed titanium trichloride particles from the interior of the chamber.

12. An apparatus according to claim 11 wherein the injection means of the desublimer includes a plurality of inlets together with means for admitting the inert gas alternately and intermittently to each of the inlets.

References Cited

UNITED STATES PATENTS

| | | | |
|---|---|---|---|
| 2,583,013 | 1/1952 | Patterson | 23—294 |
| 2,608,472 | 8/1952 | Flosdorf et al. | 23—294 |
| 2,874,040 | 2/1959 | Ferraro, Jr. | 23—87 |
| 3,296,205 | 1/1967 | Kocher et al. | 23—288.35 |
| 3,160,579 | 12/1964 | Flar | 23—288 |
| 3,413,088 | 11/1968 | Derham et al. | 23—301 |

FOREIGN PATENTS

| | | |
|---|---|---|
| 881,955 | 11/1961 | Great Britain. |
| 371,875 | 1962 | Japan. |

NORMAN YUDKOFF, Primary Examiner

T. SILVERBERG, Assistant Examiner

U.S. Cl. X.R.

23—313, 264, 87 T